US011333275B2

(12) United States Patent
Roach

(10) Patent No.: US 11,333,275 B2
(45) Date of Patent: May 17, 2022

(54) PIPE GASKET SEAL ASSIST

(71) Applicant: Troy Daniel Roach, Hixson, TN (US)

(72) Inventor: Troy Daniel Roach, Hixson, TN (US)

( * ) Notice: Subject to any disclaimer, the term of this patent is extended or adjusted under 35 U.S.C. 154(b) by 267 days.

(21) Appl. No.: 16/826,543

(22) Filed: Mar. 23, 2020

(65) Prior Publication Data

US 2021/0293361 A1 Sep. 23, 2021

(51) Int. Cl.
*F16L 21/02* (2006.01)
*F16L 21/03* (2006.01)
*F16L 17/025* (2006.01)
*F16L 47/08* (2006.01)

(52) U.S. Cl.
CPC ............ *F16L 21/03* (2013.01); *F16L 17/025* (2013.01); *F16L 47/08* (2013.01)

(58) Field of Classification Search
CPC .......... F16L 21/03; F16L 17/025; F16L 47/08
See application file for complete search history.

(56) References Cited

U.S. PATENT DOCUMENTS 1,984,806 A * 12/1934 Pfefferle ................ F16L 21/04 277/618
3,712,647 A * 1/1973 Stecher ................ F16J 15/127 285/341
5,314,213 A * 5/1994 Heister ................ F16L 21/04 285/918
6,371,530 B1 * 4/2002 Sato ................ F16L 21/08 285/379
6,457,718 B1 * 10/2002 Quesada ................ F16L 21/03 277/609
6,945,570 B2 * 9/2005 Jones ................ F16L 21/08 285/104
9,890,883 B2 * 2/2018 Maenishi ................ F16L 21/08
2021/0102647 A1 * 4/2021 Furcoiu ................ F16L 21/08

FOREIGN PATENT DOCUMENTS

DE 102018131717 A1 * 6/2020 ............ F16J 15/102
GB 2553789 A * 3/2018 ............ F16J 15/021

* cited by examiner

*Primary Examiner* — Vishal A Patel
(74) *Attorney, Agent, or Firm* — Miller & Martin PLLC; Stephen J. Stark

(57) ABSTRACT

Pipe sections are often connected together with a spigot end received within a bell end and a gasket provided there between. An assist may be helpful to apply at least a tension if not move the gasket towards a gap between the bell end and an exterior surface of the spigot end of the two pipe portions, and/or against the exterior surface of the spigot end so as to improve the likelihood of an adequate seal.

17 Claims, 3 Drawing Sheets

16
12
48
44
46
14
72
60
74
76
59
62
20
68
56
42
52
18
22
58
54
58
50
26
10
24

20
10
26
18
14
24
22
12
16

20
14
60
56
24
10
12
22
16
18

PIPE GASKET SEAL ASSIST

FIELD OF THE INVENTION

The present invention relates to assist devices utilized with gaskets utilized to seal a spigot end of a first pipe segment internal to a bell end of a second pipe segment to form a connection, such as in an effort to prevent a leak by the gasket with the seal assist providing an adjustment device to attempt to have the gasket form a better seal from external to the pipe connection.

BACKGROUND OF THE INVENTION

Pipes, such as water pipes, are often coupled to one another, often to transmit a fluid under pressure. Water pipes, and other pipes, are also often coupled to one another in sections with one end of a pipe section having a bell end which receives an opposing spigot end of another pipe section therein in successive manners so as to provide a series of segments or sections forming a longer pipe.

The bell end of a pipe is normally provided with a gasket which could be located in a slot therein. The gasket can assist in sealing one end of the pipe segment to the other at the connection. However, while the gasket seals by itself in the overwhelming majority of connections, there are some connections where there is a leak bypassing the gasket. If the leakage occurs after the pipe has been buried, this can create a large expense for a crew to dig up the pipe and then attempt to address the leak. In some situations, the fluid may need to be secured, drained and/or replacement pipe sections installed. This effort may result in disruption of service and/or extremely large expenditures for the operators, even if it happens in a relatively small percentage of connections.

There appears to be a need to be able to potentially adjust the gasket from external to the connection of the pipes or at least potentially external to the bell end of one pipe section in an effort to provide adjustment of the gasket to attempt to provide a suitable seal at the connection particularly when the connection is initially experiencing a leak.

Accordingly, improvements over prior art constructions are believed to be desirable for many applications.

SUMMARY OF THE INVENTION

Accordingly, it is a present object of many embodiments of the present invention to provide an assist for use with pipe gaskets which assist in applying forces to the gasket from external to the pipe in an effort to improve sealing of the gasket at the connection thereby assisting at attempting to prevent leaks.

It is another object of many embodiments of the present invention to provide an improved assist for applying force to a gasket at a seal of adjacent pipe sections from external to the pipe sections.

Accordingly, in accordance with many embodiments of the present invention, a first pipe section having a spigot end is inserted into a bell end of an adjacent or, second, pipe section. A gasket is normally pre-located in a slot in the bell end. At least one lip is normally utilized to assist in retaining the gasket in the bell end when the connection is performed. The spigot end of the first pipe section and the bell end of the second pipe section are designed to have a clearance or gap so that the spigot end can be inserted into the bell end. In the applicant's construction, an assist device extends at least partially into and/or through the gap, preferably in a circumnavigating manner, into the gasket and then through the gap between the pipe portions of the correction when inserted and preferably beyond an end of the bell end of the second pipe section such as to a stop or other appropriate device whereby an insert of the assist can be acted upon by a force such as a pipe clamp applying force to the stop so as to apply pressure, if not to pull the stop, and thus apply pressure to the insert through a mesh to at least a portion of the gasket towards the bell end of the second pipe section so as to assist in further compressing the gasket against an exterior surface of the spigot end of the first pipe section and/or the gap so as to increase the likelihood that an effective seal at the connection is accomplished.

In many applications, the assist not only acts on a gasket from external to the pipe sections such as with a pipe clamp or other appropriate device so as to increase the compression of the gasket from external to the pipe sections, but also may be done in such a manner so as to pull at least a portion of the gasket towards the bell end of the connection, toward or into the gap and/or against the external surface of the spigot end of the first pipe section.

In some embodiments, the assist may be constructed of a stop and an insert which may be connected together by a mesh, such as a braid of a desired pic count of a small gauge of appropriate material, such as wire, which is preferably compressed, intermediate the stop and insert. The stop and insert may be formed into cylindrical shapes possibly with the gasket over-molded onto the insert, and/or a portion of the mesh for at least some applications. Other applications may provide the gasket with an internal slot which raises the insert when inserted to apply the desired force to the gasket. The stop is preferably located external to the bell when utilized, when the assist is installed and can be acted upon by a pipe clamp or other appropriate device so as to impart a force to the stop so as to pull the assist such as the mesh and thus the insert toward the bell end, toward the gap and/or towards the exterior surface of the spigot end of the first pipe section. With such a construction, at an extremely affordable price, the likelihood of leakage may be dramatically reduced.

BRIEF DESCRIPTION OF THE DRAWINGS

The accompanying drawings illustrate the preferred embodiments of the invention and, together with the description, serve to explain the invention. These drawings are offered by way of illustration and not by way of limitation:

FIG. 4 is a top plan view of the assist of the present invention removed from the gasket;

FIG. 5 is a front plan view of the assist of FIG. 4; and

FIG. 6 is a cross-sectional view of the gasket with the assist of FIG. 4 removed for some embodiments.

DETAILED DESCRIPTION OF THE PREFERRED EMBODIMENT

Figure 1:
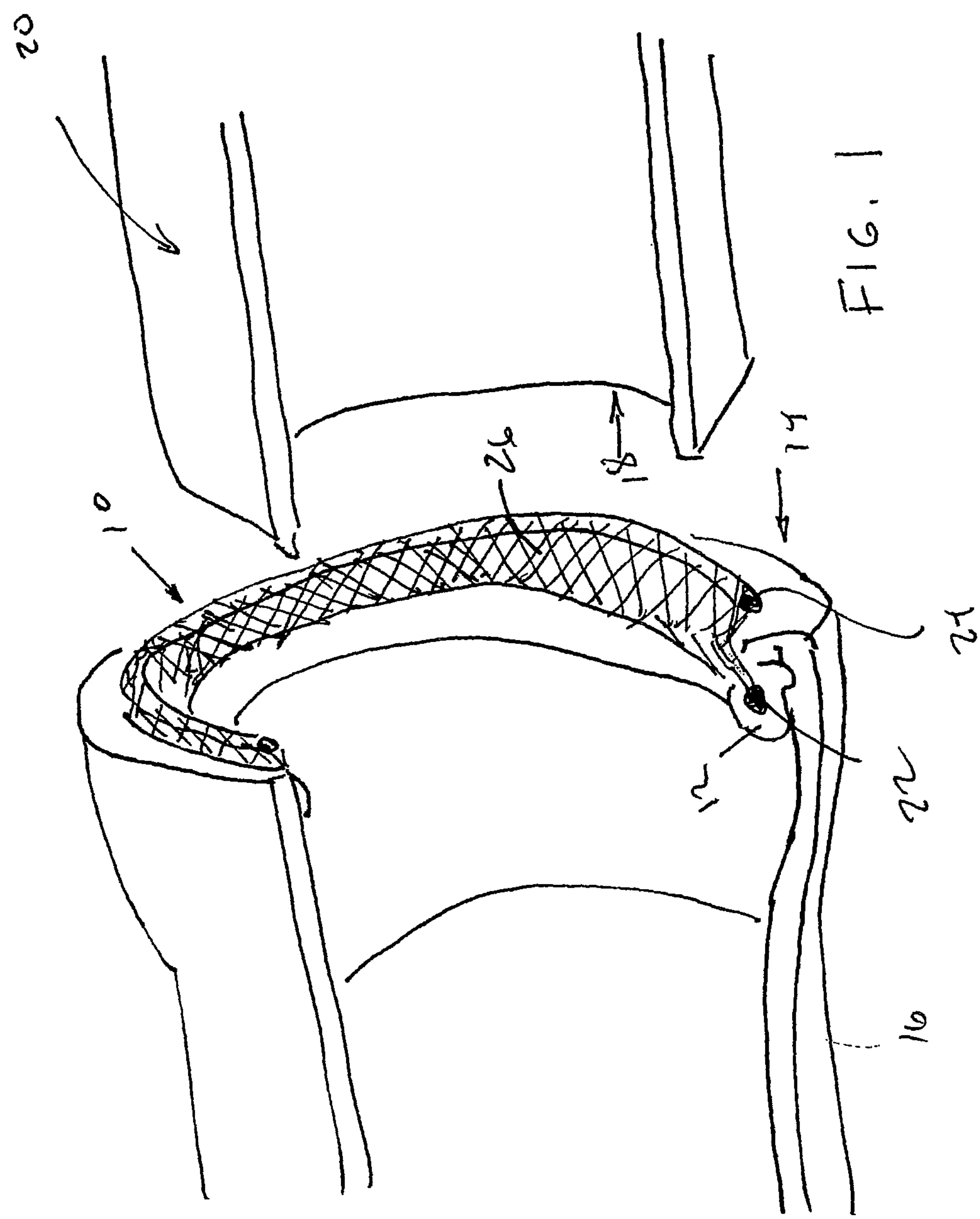
FIG. 1 is a cutaway view of a spigot end of a first pipe section being inserted into a bell end of a second pipe section to form a pipe joint of a possibly preferred embodiment of the present invention.
Figure 2:
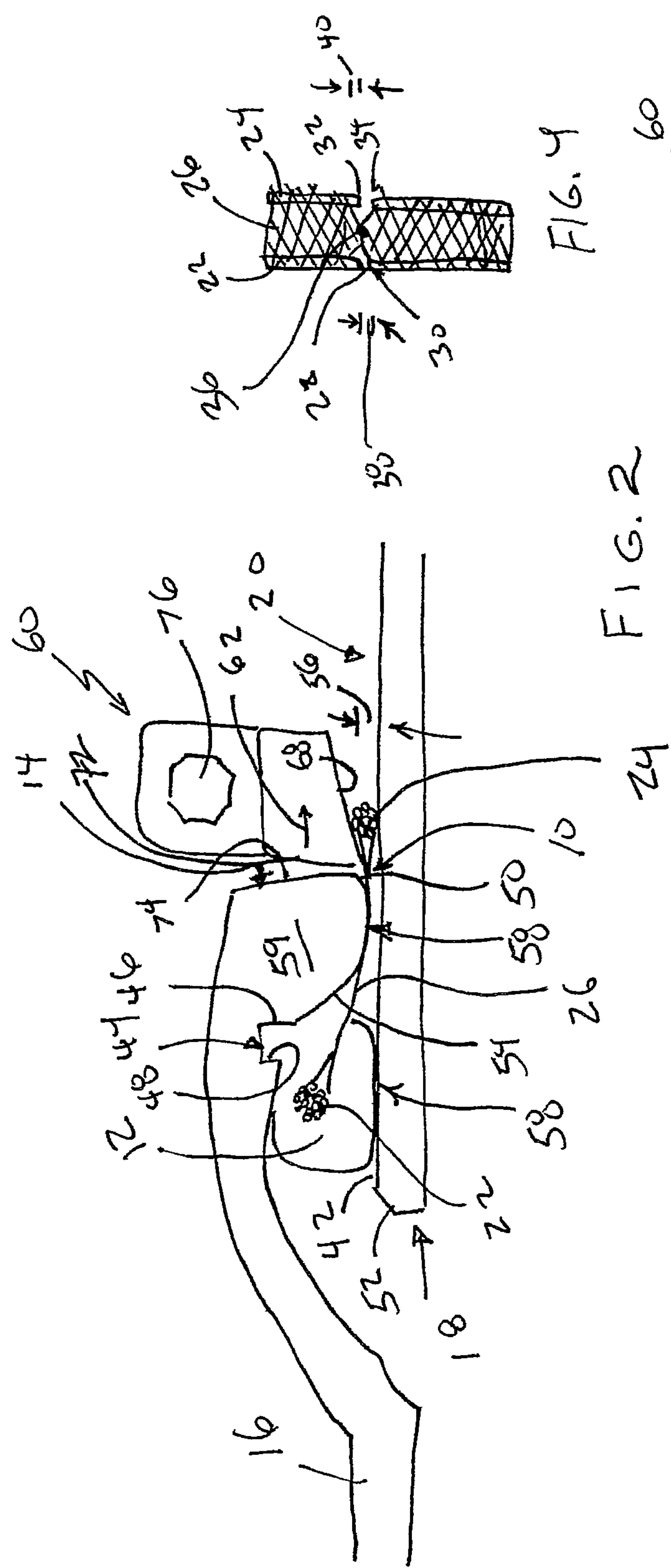
FIG. 2 is a cross-sectional view of the spigot end of the first pipe section inserted into the bell end of the second pipe section with a pipe clamp located about a portion of the assist.
Figure 3:
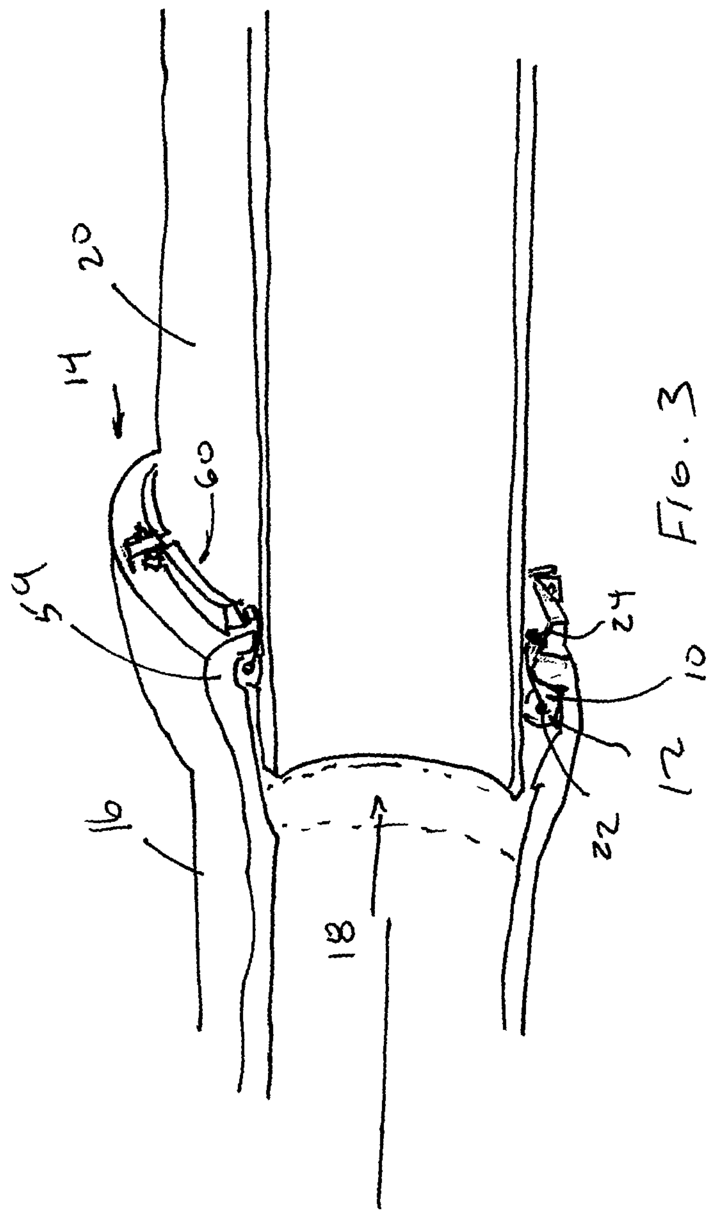
FIG. 3 is a perspective view of the embodiment of FIG. 2.

FIG. 1 shows a preferred embodiment of the present invention in the form of a gasket assist or assist 10 connected to a gasket 12 disposed towards a bell end 14 of a second pipe segment 16. This construction will be discussed in further detail with respect to other Figures.

As one can see from FIG. 1, the assist 10 preferably has an insert 22 possibly connected to a stop 24 preferably connected together about a circumference of both the insert 22 and the stop 24 such as with a mesh 26 which could be a braid or other connection system. A braid for a mesh 26 has been particularly attractive in that the pic count can be varied with a braider depending on the specifications of the particular application. Other mesh 26 constructions may be utilized with other embodiments.

As can be seen with reference to FIG. 4, either or both of the insert 22 or the stop 24 may have ends 28 and 30 or a 34 which may possibly be separated and/or spaced apart from one another while the mesh 26 may be jointed such as at a spot weld 36 or otherwise thereby holding the construction together. With such a construction, not only does the mesh 26 circumnavigate the pipe sections 16, 20 (either internally or externally, respectively), but also the insert 22 and stop 24 also substantially circumnavigate the pipe section 16, 20 when installed. Still other embodiments of the insert 22 and/or stop 24 may not have either of gaps 38, 40 but could be continuous to provide a continuous circular perimeter for at least some embodiments.

With the spigot end 18 of the first pipe portion 20 sufficiently inserted relative to the bell end 14 of the second pipe portion 16, a gasket 12 is at least partially compressed against an exterior surface 42 of the first pipe portion 20 while containing an interior surface of the second pipe portion 16 such as a slot 42. The gasket 12 is normally retained at least partially in a slot 44 and is often prevented from exiting out the bell end 14 by a lip 46. Lip 46 may also assist in defining slot 44 possibly in cooperation with a second lip 48 so as to retain the gasket 12 in a desired position. Various lips 46, 48 and/or slots 44 exist in the prior art along with the gasket 12. However, the construction of this application is different than prior art. Specifically, while bell end 14 often has a slope 50 to accommodate insertion of spigot end 18 which may also have a slope 52 to assist in insertion of the spigot end into the bell end, it may be that a rear face 54 at the bell end 14 may also be sloped toward bell end 14 as opposed to perpendicularly oriented such as lip 46.

A gap 56 preferably results between an interior or innermost surface 58 of the bell 59 at the bell end 14 and the exterior surface 42 of the first pipe portion of 20 so as to facilitate the insertion of the first pipe portion 20 into the bell end 14 of the second pipe portion 16. The gasket 12 is thus located on a slot 44 which has a larger radius from the centerline of the second pipe portion 16 than the innermost surface 58 which can assist in releasing the gasket in the slot 44 particularly when the pipe sections 22, 16 have fluid therein and/or are under pressure. Within this gap for the preferred embodiment, the assist 10 can extend therethrough to provide a stop 24, if utilized, external to the bell end 14 while connected by mesh 26 or other structure to the insert 22 as will be provided in further detail below. While the sealing of the gasket 12 against exterior surface of 42 may be sufficient at this point, for many embodiments an ability to adjust the seal of a gasket surface 58 against exterior surface 42 of the first pipe portion 20 is desirable after installation of the first pipe portion 20.

With the assist 10, the stop 24 can exert a tension along mesh 26 to potentially apply force, if not pull insert 22 towards the bell end 14 and/or towards the exterior surface 42 and/or gap 36 so as to assist in further compressing the gasket 12 either towards bell end 14, towards the gap 56 between the bottom surface 58 of the bell end 14 and exterior section of the first pipe portion 20 and/or adjusting the exterior surface 42 of the first pipe section 20 as would be understood by one skilled in the art so as to provide a seal such as to provide leakage such as if one had an inadequate seal. Tension could be applied to insert 22 such as through mesh 26 such as when the clamp 60 is tightened. For many embodiments, not only is additional tension provided on the stop 24 and/or through the mesh 26 to the insert 22 but also it is potential that the assist 10 may actually move the insert 22 at least a small amount towards the bell end 14 of the second pipe portion 16 during this process.

Remember that this is the illustrated embodiment as opposed to all embodiments. There are certainly other embodiments that could apply similar technology so as to apply force to, if not move, an insert 22 and/or gasket 12 with a mesh 26 or other structure towards the bell end 14 and/or the exterior surface 42 of the first pipe portion 20 and/or the gap 56 so as to apply appropriate tension thereto to the gasket 12 so as to increase the likelihood of sealing of the gasket 12 against the exterior surface 42 of the second pipe portion 20 and/or the gap 56 to prevent leaking of fluids from internal to the pipe portions 16, 20 through the connection. Gasket 12 is preferably a resilient structure for many embodiments and can be made of rubber (natural and/or synthetic), silicone and/or other materials.

It is envisioned that for many embodiments stainless steel wire is utilized by a braiding machine to braid spaced apart insert and stop 22, 24 possibly with the other structure intermediate the 22 insert and stop 24. The braider when providing braid 26 may provide a surface which can be run through a pair of rollers or otherwise be flattened so as to provide a flat mesh 26 intermediate the insert 22 and stop 24 for at least some embodiments. A length could be cut and the mesh 26 spot welded or otherwise connected to form a round assist 10. Mesh 26 could be replaced with other structures with other embodiments. Insert 10 could still have a structure passing through the gap 56 to the insert 22 and/or gasket 12. Mesh 26 could be provided in other methodologies other than with a braider or for other embodiments. If the mesh 26 is a braid, the braid can be varied such as by requiring the pic count to any applicable number of braids or intersecting per inch or other factors such as the material comprising the mesh 26 whether it be steel such as stainless steel or other steels, and/or other metals such as aluminum, etc. and/or fabric materials such as Kevlar, other polymers, carbon fiber, and/or other appropriate materials or blends thereof.

In examining a cross-section of the components of the mesh 26, individual strands could be circular but could be a triangle or other appropriate cross-sectional shape. While pics could relatively easily be varied from one pic per inch to 100 pics per inch or more, as the applicant has discovered that exceeding to 25 pics per inch is not normally satisfactory for many embodiments.

Some embodiments of the insert 22 may have a diameter of roughly 3/8 inch or other appropriate and possibly be comprised of braided cable. Stop 24 may also be a braided cable of 3/16 inch or other appropriate dimension. Other products for insert 22 and/or stop 24 may be utilized with other embodiments. Furthermore, FIG. 6 shows that the gasket 12 for at least some embodiments may have a pre-formed slot 90 and/or a bore 92 which may receive the insert 22 therein. Alternatively, the bore 92 and slot 90 may be the location of the insert 22 and mesh 26 such as if the gasket 12 were over molded over the assist 10. Still other embodiments may function differently so as to provide an insert 10 which is connected by a mesh 26 of multiple fibers or fingers extending through the gap 56 to the insert 22 and/or gasket 12 so as to apply a tension to the gasket 12 to pull it toward the gap 56 and/or against the exterior surface of 56 of the first pipe portion of 20 and/or toward the bell end 14 of the second pipe portion 16 so as to improve the sealing of the gasket 12 against the second pipe portion 20.

The various assist 10 can be relatively inexpensive to provide and it may be that the assist 10 could be provided with all pipe gaskets 12, if not at least with those pipe gaskets 12 which are placed in locations difficult to access after installation so as to create a situation with an extremely low likelihood of leakage past those gaskets 12. Furthermore, although one clamp 60 is illustrated, various clamp constructions could be provided for various embodiments as would be understood by those with ordinary skill in the art.

Although the clamp 60 is the preferred embodiment of how to apply tension to the insert 22 and/or gasket 12, there are certainly other constructions and/or devices that could apply tension through the gap 56 such as along a mesh 56 to an insert 22 in various other embodiments. Clamp 60 could have a rear face 72 which may act against front face 74 of bell 59 to push stop 24 away from the bell end 14 when tightened. Clamp 60 may instead or also have slope 68 to assist in and/or apply force to the stop 24 possible when tightened or otherwise, such as when bolts 76, 78, are tightened or otherwise.

Numerous alterations to the structures herein disclosed will suggest themselves to those skilled in the art. However, it is to be understood that the present disclosure relates to the preferred embodiment of the invention for which is for purposes of illustration only and not to be construed as a limitation of the invention. All such modifications which do not depart from the spirit of the invention are intended to be included within the scope of the appending claims.

What is claimed is:

1. A connection system of adjacent pipe sections comprising:

a first pipe section having a spigot end with an exterior surface;

a second pipe section having a bell end, said bell end having a slot extending a further distance from a centerline of the second pipe section than an innermost portion of a bell at the bell end;

a gasket disposed at least partially in the slot, the gasket having a gasket bore;

wherein the spigot end of the first pipe section is received within the bell end of the second pipe section at the connection, and a gap spaces the innermost portion of the bell of the second pipe section from the exterior surface of the spigot end of the first pipe section;

an insert positioned in the gasket bore; and a flexible assist member extending through the gap connected to the insert and a stop and applying a force on the gasket through the stop located external to the gap at the bell end of the second pipe section from external to the slot, said stop imparting a tensile force biasing the gasket toward the gap.

2. The improvement of claim 1 wherein the insert at least substantially circumnavigates the first pipe section.

3. The improvement of claim 1 wherein the insert is located internal to the gasket.

4. The improvement of claim 1 wherein the gasket has the gasket bore and the insert is positioned in the bore of the gasket.

5. The improvement of claim 4 wherein the gasket has a slot extending from an exterior surface of the gasket to the bore.

6. The improvement of claim 1 wherein the insert is imbedded in the gasket.

7. The improvement of claim 5 wherein the flexible assist further comprises a mesh, said mesh connected to the insert and extending through the slot of the gasket.

8. The improvement of claim 7 wherein the mesh is a braid.

9. The improvement of claim 8 wherein the mesh at least substantially circumnavigates the first pipe portion.

10. The improvement of claim 9 wherein the pic count of the braid is between one and twenty-five.

11. The improvement of claim 7 wherein the mesh at least substantially circumnavigates the first pipe portion.

12. The improvement of claim 7 wherein the mesh connects the stop to the insert.

13. The improvement of claim 12 wherein the mesh is a braid surrounding the insert and stop and extends through the gap.

14. The improvement of claim 13 wherein at least one of the insert and the stop is a cable.

15. A connection system of adjacent pipe sections comprising:

a first pipe section having a spigot end with an exterior surface;

a second pipe section having a bell end, said bell end having a slot extending a further distance from a centerline of the second pipe section than an innermost portion of a bell at the bell end, and a sloped rear face extending upwardly from toward the bell end toward the slot;

a gasket disposed at least partially in the slot;

wherein the spigot end of the first pipe section is received within the bell end of the second pipe section at the connection, and a gap spaces the innermost portion of the bell of the second pipe section from the exterior surface of the spigot end of the first pipe section;

an insert molded into the gasket and connected to a flexible assist member extending through the gap and a portion of the gasket, said flexible assist member connected to a stop, said stop spaced by a portion of the flexible assist member from the gasket;

wherein a force is applied to the gasket from external to the slot through the flexible assist member by the stop located external to the gap at the bell end of the second pipe section from external to the slot, said stop imparting a tensile force biasing the gasket outwardly toward the gap and downwardly along the sloped rear face toward the bell end of the second pipe section.

16. A method of connecting adjacent pipe sections comprising the steps of:

providing a first pipe section having a spigot end with an exterior surface;

providing a second pipe section having a bell end, said bell end having a slot extending a further distance from a centerline of the second pipe section than an innermost portion of a bell at the bell end, and a sloped rear face extending upwardly from toward the bell end toward the slot;

locating a gasket at least partially in the slot of the bell end, the gasket having a gasket bore, said insert positioned in the gasket bore with a flexible assist member coupling the insert to a stop;

inserting the spigot end of the first pipe section within the bell end of the second pipe section to form a connection, wherein a gap spaces the innermost portion of the bell of the second pipe section from the exterior surface of the spigot end of the first pipe section, with the flexible assist member passing through the gap and the stop located external to the first and second pipe sections; and then applying a tensile force on the gasket through the stop from external to the slot, thereby biasing the gasket toward the gap downwardly along the sloped rear face toward the bell end of the second pipe section.

17. A method of connecting adjacent pipe sections comprising the steps of:

providing a first pipe section having a spigot end with an exterior surface;

providing a second pipe section having a bell end, said bell end having a slot extending a further distance from a centerline of the second pipe section than an innermost portion of a bell at the bell end;

locating a gasket with a gasket bore with an insert in the gasket bore and at least partially in the slot of the bell end, said insert connected by a flexible assist member connected to a stop, said flexible assist member extending away from the gasket and spacing the stop away from the gasket;

inserting the spigot end of the first pipe section within the bell end of the second pipe section to form a connection, wherein a gap spaces the innermost portion of the bell of the second pipe section from the exterior surface of the spigot end of the first pipe section, with the flexible assist member passing through the gap and the stop located external to the first and second pipe sections;

providing a clamp having a sloped surface;

clamping the clamp about the first pipe section while placing the sloped surface in contact with the stop to thereby apply a tensile force on the gasket through the stop from external to the slot and the first and second pipe sections thereby biasing the gasket in the slot toward the gap.

* * * * *